(12) United States Patent　　(10) Patent No.: US 8,737,254 B2
Kliger et al.　　(45) Date of Patent: *May 27, 2014

(54) SYSTEMS AND METHODS FOR REDUCING RESERVATION REQUEST OVERHEAD IN A COMMUNICATIONS NETWORK

(75) Inventors: Avraham Kliger, Ramat Gan (IL); Philippe Klein, Jerusalem (IL); Yitshak Ohana, Givat Zeev (IL)

(73) Assignee: Broadcom Corporation, Irvine, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/535,755

(22) Filed: Jun. 28, 2012

(65) Prior Publication Data

US 2012/0269090 A1　　Oct. 25, 2012

Related U.S. Application Data

(63) Continuation of application No. 12/638,038, filed on Dec. 15, 2009, now Pat. No. 8,213,309.

(60) Provisional application No. 61/140,057, filed on Dec. 22, 2008, provisional application No. 61/149,085, filed on Feb. 2, 2009.

(51) Int. Cl.
　　*G01R 31/08*　　(2006.01)
(52) U.S. Cl.
　　USPC ............ 370/252; 370/468; 370/232; 370/230
(58) Field of Classification Search
　　None
　　See application file for complete search history.

(56) References Cited

U.S. PATENT DOCUMENTS

| | | | |
|---|---|---|---|
| 3,836,888 | A | 9/1974 | Boenke et al. |
| 4,413,229 | A | 11/1983 | Grant |
| 4,536,875 | A | 8/1985 | Kume et al. |
| 4,608,685 | A | 8/1986 | Jain et al. |
| 4,893,326 | A | 1/1990 | Duran et al. |
| 5,052,029 | A | 9/1991 | James et al. |
| 5,170,415 | A | 12/1992 | Yoshida et al. |
| 5,343,240 | A | 8/1994 | Yu |

(Continued)

FOREIGN PATENT DOCUMENTS

| | | |
|---|---|---|
| CN | 1422043 A | 6/2003 |
| CN | 1588827 A | 3/2005 |

(Continued)

OTHER PUBLICATIONS

Multichannel News, MoCA Brewing Up Bigger Bandwidth, Dec. 15, 2008 Interview with CTO Anton Monk, http://www.multichannel.com/article/160878-MoCa.sub.--Brewing.sub.--Up.su- b.--bigger.sub.--Bandwidth.php downloaded on Mar. 29, 2009.

(Continued)

*Primary Examiner* — Duc C Ho
(74) *Attorney, Agent, or Firm* — McDermott Will & Emery LLP (57) ABSTRACT

Systems and methods for reducing reservation request overhead in a communications network in which devices are connected via a coax network are provided. A method for managing transmission of data over a MoCA network according to the invention may include monitoring data transmission requirements at a node on the network; generating statistics of the data transmission requirements; predicting transmission requirements from the statistics; and reserving future transmission opportunities in view of the predicted transmission requirements.

27 Claims, 6 Drawing Sheets

(56) References Cited

U.S. PATENT DOCUMENTS

| | | | |
|---|---|---|---|
| 5,367,517 A * | 11/1994 | Cidon et al. | 370/431 |
| 5,421,030 A | 5/1995 | Baran | |
| 5,440,335 A | 8/1995 | Beveridge | |
| 5,570,355 A | 10/1996 | Dail et al. | |
| 5,638,374 A | 6/1997 | Heath | |
| 5,671,220 A | 9/1997 | Tonomura | |
| 5,796,739 A | 8/1998 | Kim et al. | |
| 5,802,173 A | 9/1998 | Hamilton-Piercy et al. | |
| 5,805,591 A | 9/1998 | Naboulsi et al. | |
| 5,805,806 A | 9/1998 | McArthur | |
| 5,815,662 A | 9/1998 | Ong | |
| 5,822,677 A | 10/1998 | Peyrovian | |
| 5,822,678 A | 10/1998 | Evanyk | |
| 5,845,190 A | 12/1998 | Bushue et al. | |
| 5,850,400 A | 12/1998 | Eames et al. | |
| 5,854,887 A | 12/1998 | Kindell et al. | |
| 5,856,975 A | 1/1999 | Rostoker et al. | |
| 5,877,821 A | 3/1999 | Newlin et al. | |
| 5,886,732 A | 3/1999 | Humpleman | |
| 5,896,556 A | 4/1999 | Moreland et al. | |
| 5,917,624 A | 6/1999 | Wagner | |
| 5,930,493 A | 7/1999 | Ottesen et al. | |
| 5,963,844 A | 10/1999 | Dail | |
| 5,982,784 A | 11/1999 | Bell | |
| 6,009,465 A | 12/1999 | Decker et al. | |
| 6,028,860 A | 2/2000 | Laubach et al. | |
| 6,055,242 A | 4/2000 | Doshi et al. | |
| 6,069,588 A | 5/2000 | O'Neill, Jr. | |
| 6,081,519 A | 6/2000 | Petler | |
| 6,111,911 A | 8/2000 | Sanderford, Jr. et al. | |
| 6,118,762 A | 9/2000 | Nomura et al. | |
| 6,157,645 A | 12/2000 | Shobatake | |
| 6,167,120 A | 12/2000 | Kikinis | |
| 6,192,070 B1 | 2/2001 | Poon et al. | |
| 6,219,409 B1 | 4/2001 | Smith et al. | |
| 6,229,818 B1 | 5/2001 | Bell | |
| 6,243,413 B1 | 6/2001 | Beukema | |
| 6,304,552 B1 | 10/2001 | Chapman et al. | |
| 6,307,862 B1 | 10/2001 | Silverman | |
| 6,434,151 B1 | 8/2002 | Caves et al. | |
| 6,466,651 B1 | 10/2002 | Dailey | |
| 6,481,013 B1 | 11/2002 | Dinwiddie et al. | |
| 6,526,070 B1 | 2/2003 | Bernath et al. | |
| 6,553,568 B1 | 4/2003 | Fijolek et al. | |
| 6,563,829 B1 | 5/2003 | Lyles et al. | |
| 6,567,654 B1 | 5/2003 | Coronel Arredondo et al. | |
| 6,611,537 B1 | 8/2003 | Edens et al. | |
| 6,622,304 B1 | 9/2003 | Carhart | |
| 6,637,030 B1 | 10/2003 | Klein | |
| 6,650,624 B1 | 11/2003 | Quigley et al. | |
| 6,745,392 B1 | 6/2004 | Basawapatna et al. | |
| 6,763,032 B1 | 7/2004 | Rabenko et al. | |
| 6,785,296 B1 | 8/2004 | Bell | |
| 6,816,500 B1 | 11/2004 | Mannette et al. | |
| 6,831,899 B1 | 12/2004 | Roy | |
| 6,836,515 B1 | 12/2004 | Kay et al. | |
| 6,859,899 B2 | 2/2005 | Shalvi et al. | |
| 6,862,270 B1 | 3/2005 | Ho | |
| 6,877,043 B2 | 4/2005 | Mallory et al. | |
| 6,877,166 B1 | 4/2005 | Roeck et al. | |
| 6,898,210 B1 | 5/2005 | Cheng et al. | |
| 6,930,989 B1 | 8/2005 | Jones, IV et al. | |
| 6,940,833 B2 | 9/2005 | Jonas et al. | |
| 6,950,399 B1 | 9/2005 | Bushmitch et al. | |
| 6,961,314 B1 | 11/2005 | Quigley et al. | |
| 6,985,437 B1 | 1/2006 | Vogel | |
| 6,996,198 B2 | 2/2006 | Cvetkovic | |
| 7,035,270 B2 | 4/2006 | Moore, Jr. et al. | |
| 7,065,779 B1 | 6/2006 | Crocker et al. | |
| 7,089,580 B1 | 8/2006 | Vogel et al. | |
| 7,116,685 B2 | 10/2006 | Brown et al. | |
| 7,127,734 B1 | 10/2006 | Amit | |
| 7,133,697 B2 | 11/2006 | Judd et al. | |
| 7,142,553 B1 | 11/2006 | Ojard et al. | |
| 7,146,632 B2 | 12/2006 | Miller | |
| 7,149,220 B2 | 12/2006 | Beukema et al. | |
| 7,194,041 B2 | 3/2007 | Kadous | |
| 7,292,527 B2 | 11/2007 | Zhou et al. | |
| 7,296,083 B2 | 11/2007 | Barham et al. | |
| 7,327,754 B2 | 2/2008 | Mills et al. | |
| 7,372,853 B2 | 5/2008 | Sharma et al. | |
| 7,453,855 B1 * | 11/2008 | Madhow | 370/335 |
| 7,460,543 B2 | 12/2008 | Malik et al. | |
| 7,487,532 B2 | 2/2009 | Robertson et al. | |
| 7,532,642 B1 | 5/2009 | Peacock | |
| 7,532,693 B1 | 5/2009 | Narasimhan | |
| 7,555,064 B2 | 6/2009 | Beadle | |
| 7,574,615 B2 | 8/2009 | Weng et al. | |
| 7,606,256 B2 | 10/2009 | Vitebsky et al. | |
| 7,652,527 B2 | 1/2010 | Ido et al. | |
| 7,653,164 B2 | 1/2010 | Lin et al. | |
| 7,675,970 B2 | 3/2010 | Nemiroff et al. | |
| 7,783,259 B2 | 8/2010 | Dessert et al. | |
| 7,916,756 B2 | 3/2011 | Atsumi et al. | |
| 8,213,309 B2 * | 7/2012 | Kliger et al. | 370/230 |
| 8,483,080 B2 * | 7/2013 | Quigley et al. | 370/252 |
| 2001/0039660 A1 | 11/2001 | Vasilevsky et al. | |
| 2002/0010562 A1 | 1/2002 | Schleiss et al. | |
| 2002/0021465 A1 | 2/2002 | Moore et al. | |
| 2002/0059623 A1 | 5/2002 | Rodriguez et al. | |
| 2002/0059634 A1 | 5/2002 | Terry et al. | |
| 2002/0069417 A1 | 6/2002 | Kliger et al. | |
| 2002/0078247 A1 | 6/2002 | Lu et al. | |
| 2002/0078249 A1 | 6/2002 | Lu et al. | |
| 2002/0097821 A1 | 7/2002 | Hebron et al. | |
| 2002/0105970 A1 | 8/2002 | Shvodian | |
| 2002/0118699 A1 * | 8/2002 | McKinnon et al. | 370/447 |
| 2002/0136231 A1 | 9/2002 | Leatherbury et al. | |
| 2002/0141347 A1 | 10/2002 | Harp et al. | |
| 2002/0150155 A1 | 10/2002 | Florentin et al. | |
| 2002/0174423 A1 | 11/2002 | Fifield et al. | |
| 2002/0194605 A1 | 12/2002 | Cohen et al. | |
| 2003/0013453 A1 | 1/2003 | Lavaud et al. | |
| 2003/0016751 A1 | 1/2003 | Vetro et al. | |
| 2003/0063563 A1 | 4/2003 | Kowalski | |
| 2003/0066082 A1 | 4/2003 | Kliger et al. | |
| 2003/0099253 A1 | 5/2003 | Kim | |
| 2003/0152059 A1 | 8/2003 | Odman | |
| 2003/0169769 A1 | 9/2003 | Ho et al. | |
| 2003/0193619 A1 | 10/2003 | Farrand | |
| 2003/0198244 A1 | 10/2003 | Ho et al. | |
| 2004/0004934 A1 | 1/2004 | Zhu et al. | |
| 2004/0037366 A1 | 2/2004 | Crawford | |
| 2004/0047284 A1 | 3/2004 | Eidson | |
| 2004/0107445 A1 | 6/2004 | Amit | |
| 2004/0163120 A1 | 8/2004 | Rabenko et al. | |
| 2004/0172658 A1 | 9/2004 | Rakib et al. | |
| 2004/0177381 A1 | 9/2004 | Kliger et al. | |
| 2004/0224715 A1 | 11/2004 | Rosenlof et al. | |
| 2004/0258062 A1 | 12/2004 | Narvaez | |
| 2005/0015703 A1 | 1/2005 | Terry et al. | |
| 2005/0097196 A1 | 5/2005 | Wronski et al. | |
| 2005/0152350 A1 | 7/2005 | Sung et al. | |
| 2005/0152359 A1 | 7/2005 | Giesberts et al. | |
| 2005/0175027 A1 | 8/2005 | Miller et al. | |
| 2005/0204066 A9 | 9/2005 | Cohen et al. | |
| 2005/0213405 A1 | 9/2005 | Stopler | |
| 2006/0059400 A1 | 3/2006 | Clark et al. | |
| 2006/0062250 A1 | 3/2006 | Payne | |
| 2006/0078001 A1 | 4/2006 | Chandra et al. | |
| 2006/0104201 A1 | 5/2006 | Sundberg et al. | |
| 2006/0256799 A1 | 11/2006 | Eng | |
| 2006/0256818 A1 | 11/2006 | Shvodian et al. | |
| 2006/0268934 A1 | 11/2006 | Shimizu et al. | |
| 2006/0280194 A1 | 12/2006 | Jang et al. | |
| 2007/0025317 A1 | 2/2007 | Bolinth et al. | |
| 2007/0040947 A1 | 2/2007 | Koga | |
| 2007/0127373 A1 | 6/2007 | Ho et al. | |
| 2007/0160213 A1 | 7/2007 | Un et al. | |
| 2007/0171919 A1 | 7/2007 | Godman et al. | |
| 2007/0183786 A1 | 8/2007 | Hinosugi et al. | |
| 2007/0206551 A1 | 9/2007 | Moorti et al. | |
| 2007/0253379 A1 | 11/2007 | Kumar et al. | |
| 2007/0286121 A1 | 12/2007 | Kolakowski et al. | |

(56) References Cited

U.S. PATENT DOCUMENTS

| | | |
|---|---|---|
| 2008/0037589 A1 | 2/2008 | Kliger et al. |
| 2008/0080369 A1 | 4/2008 | Sumioka et al. |
| 2008/0089268 A1 | 4/2008 | Kinder et al. |
| 2008/0117919 A1 | 5/2008 | Kliger et al. |
| 2008/0117929 A1 | 5/2008 | Kliger et al. |
| 2008/0130779 A1 | 6/2008 | Levi et al. |
| 2008/0178229 A1 | 7/2008 | Kliger et al. |
| 2008/0189431 A1 | 8/2008 | Hyslop et al. |
| 2008/0212591 A1 | 9/2008 | Wu et al. |
| 2008/0238016 A1 | 10/2008 | Chen et al. |
| 2008/0259957 A1 | 10/2008 | Kliger et al. |
| 2008/0271094 A1 | 10/2008 | Kliger et al. |
| 2008/0273591 A1 | 11/2008 | Brooks et al. |
| 2008/0279219 A1 | 11/2008 | Wu et al. |
| 2008/0298241 A1 | 12/2008 | Ohana et al. |
| 2009/0010263 A1 | 1/2009 | Ma et al. |
| 2009/0063878 A1 | 3/2009 | Schmidt et al. |
| 2009/0092154 A1* | 4/2009 | Malik et al. ............... 370/480 |
| 2009/0122901 A1 | 5/2009 | Choi et al. |
| 2009/0165070 A1 | 6/2009 | McMullin et al. |
| 2009/0217325 A1 | 8/2009 | Kliger et al. |
| 2009/0252172 A1 | 10/2009 | Hare |
| 2009/0254794 A1 | 10/2009 | Malik et al. |
| 2009/0257483 A1 | 10/2009 | French et al. |
| 2009/0279643 A1 | 11/2009 | Shusterman |
| 2009/0316589 A1 | 12/2009 | Shafeeu |
| 2010/0031297 A1 | 2/2010 | Klein et al. |
| 2010/0080312 A1 | 4/2010 | Moffatt et al. |
| 2010/0150016 A1 | 6/2010 | Barr |
| 2010/0158015 A1 | 6/2010 | Wu |
| 2010/0158021 A1 | 6/2010 | Kliger et al. |
| 2010/0158022 A1 | 6/2010 | Kliger et al. |
| 2010/0162329 A1 | 6/2010 | Ford et al. |
| 2010/0174824 A1 | 7/2010 | Aloni et al. |
| 2010/0238932 A1 | 9/2010 | Kliger et al. |
| 2010/0246586 A1 | 9/2010 | Ohana et al. |
| 2010/0254278 A1 | 10/2010 | Kliger et al. |
| 2010/0254402 A1 | 10/2010 | Kliger et al. |
| 2010/0281195 A1 | 11/2010 | Daniel et al. |
| 2010/0284474 A1 | 11/2010 | Kliger et al. |
| 2011/0013633 A1 | 1/2011 | Klein et al. |
| 2011/0080850 A1 | 4/2011 | Klein et al. |
| 2011/0205891 A1 | 8/2011 | Kliger et al. |
| 2011/0310907 A1 | 12/2011 | Klein et al. |

FOREIGN PATENT DOCUMENTS

| | | |
|---|---|---|
| EP | 0385695 A2 | 9/1990 |
| EP | 0622926 A2 | 11/1994 |
| EP | 1501326 | 1/2005 |
| JP | 60160231 A | 8/1985 |
| WO | WO-9827748 A2 | 6/1998 |
| WO | WO-9831133 A2 | 7/1998 |
| WO | WO-9935753 A2 | 7/1999 |
| WO | WO-9946734 | 9/1999 |
| WO | WO-0031725 | 6/2000 |
| WO | WO-0055843 | 9/2000 |
| WO | WO-0180030 | 10/2001 |
| WO | WO-0219623 A2 | 3/2002 |

OTHER PUBLICATIONS

Ovadia S., "MoCA: Ubiquitous Multimedia Networking in the Home," Proceedings of the SPIE—The International Society for Optical Engineering SPIE—The International Society for Optical Engineering USA, [Online] 2007, XP002584642 ISSN: 0277-786X, Retrieved on Jul. 28, 2010 from the Internet: URL: http://spiedl.aip.org//getpdf/servlet/getPDFServlet?filetype=pdf&id=PSISD-G00677600000167760C00000&idtype=cvips&prog=normal>.

"Home Networking on Coax for Video and Multimedia, Overview for IEEE 802.1AVB", Shlomo Ovadia, San Ramon/California, May 30, 2007.

"Microtune Introduces Industry's First 1-GHZ Cable Tuners Compatible with MoCA—Home Networking Standard", Business Wire, San Francisco, California, Mar. 19, 2007.

* cited by examiner

SYSTEMS AND METHODS FOR REDUCING RESERVATION REQUEST OVERHEAD IN A COMMUNICATIONS NETWORK

CROSS-REFERENCED TO RELATED APPLICATIONS

This application is a continuation application of U.S. patent application Ser. No. 12/638,038 filed on Dec. 15, 2009, now issued as U.S. Pat. No. 8,213,309, entitled "SYSTEMS AND METHODS FOR REDUCING LATENCY AND RESERVATION REQUEST OVERHEAD IN A COMMUNICATIONS NETWORK" (hereinafter, the "038 application"), which is hereby incorporated by reference herein in its entirety. The '038 application claims the benefit of U.S. Provisional Patent Application Nos. 61/140,057, filed Dec. 22, 2008, entitled "Systems and Methods to Reduce the Reservation Request Overhead in a Communication Network," which is hereby incorporated by reference herein in its entirety, and 61/149,085, filed Feb. 2, 2009, entitled "Systems and Methods to Reduce Reservation Request Overhead in a Communication Network," which is hereby incorporated by reference herein in its entirety.

FIELD OF TECHNOLOGY

The present invention relates generally to information networks and specifically to transmitting information such as media information over communication lines such as coaxial cable (hereinafter "coax"), thereby to form a communications network.

BACKGROUND OF THE INVENTION

Home network technologies using coax are known generally. The Multimedia over Coax Alliance (MoCA™), at its website mocalliance.org, provides an example of a suitable specification (MoCA 1.0) for networking of digital video and entertainment through existing coaxial cable in the home which has been distributed to an open membership. MoCA 1.0 specification is incorporated by reference herein in its entirety.

Home networking over coax taps into the vast amounts of unused bandwidth available on the in-home coax. More than 70% of homes in the United States have coax already installed into the home infrastructure. Many have existing coax in one or more primary entertainment consumption locations such as family rooms, media rooms and master bedrooms—ideal for deploying networks. Home networking technology allows homeowners to utilize this infrastructure as a networking system and to deliver other entertainment and information programming with high QoS (Quality of Service).

The technology underlying home networking over coax provides high speed (270 mbps), high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Home networking over coax can also be used as a backbone for multiple wireless access points used to extend the reach of wireless network throughout a consumer's entire home.

Home networking over coax provides a consistent, high throughput, high quality connection through the existing coaxial cables to the places where the video devices currently reside in the home. Home networking over coax provides a primary link for digital entertainment, and may also act in concert with other wired and wireless networks to extend the entertainment experience throughout the home.

Currently, home networking over coax works with access technologies such as ADSL and VDSL services or Fiber to the Home (FTTH), that typically enter the home on a twisted pair or on an optical fiber, operating in a frequency band from a few hundred kilohertz to 8.5 MHz for ADSL and 12 MHZ for VDSL. As services reach the home via xDSL or FTTH, they may be routed via home networking over coax technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, home networking over coax type functionalities run in parallel with the cable functionalities, on different frequencies.

It would be desirable to reduce reservation request overhead in a MoCA home network.

SUMMARY OF THE INVENTION

A system and/or method for reducing latency and reservation request overhead associated with MoCA devices connected by a MoCA home network, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments than those described herein may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

In addition, various signals representing data or events as described herein may be transferred between a source and a destination in the form of electromagnetic waves traveling through signal-conducting media such as metal wires, optical fibers, and/or wireless transmission media (e.g., air and/or space).

MoCA networks are typically contention free networks. Transmission access to the media may be controlled by a single entity called "Network Controller" (NC). Nodes controlled by the NC are referred to for the purposes of this application as "Existing Nodes" (EN).

In certain embodiments of the invention, the NC controls the timing of the respective accesses of each of the ENs to the media. Such control may be implemented by broadcasting to all the ENs a mapping of the media access plan ("MAP") for the next period of time. Such period of time is typically referred to as "MAP cycle."

MoCA Version 1.x Media Access Sequence

In the MoCA version 1.x, an EN may be provided access to the network according to the following steps:

1) In each MAP cycle, the NC schedules opportunities (Reservation Request Allocation Unit (RRAU)) for EN nodes to request a transmission slot.

The allocation for RRAU within a MAP cycle is bound—i.e., time-limited—to preserve the data bandwidth. If the number of ENs does not permit the NC to allocate an RRAU for every node within a single MAP cycle, the NC may allocate RRAU to nodes over multiple MAP cycles on a round-robin base or in some other suitable distribution.

2) Whenever an EN node has an outstanding frame(s) to transmit, it can send a Reservation Request frame (RR) in the RRAU to request a data transmission opportunity ("TxOP").

3) The NC can grant the TxOP request generally within the next MAP following the receipt of the RR.

4) The EN generally transmits its outstanding frame(s) in the MAP cycle following receipt of grant.

The scope of the invention relates to methods to reduce the access latency of the EN with respect to the network and to reduce the overhead of reservation requests. It should be noted that the overhead attributable to reservation requests linearly increases with the number of EN nodes.

Such methods can dynamically optimize the occurrence of RRAU and Forward Reservation ("FR") based at least on part on ingress—i.e., Ethernet to MoCA network—traffic monitoring.

Traffic Monitoring and Analysis

In some exemplary systems and method according to the invention, each EN preferably monitors its respective ingress traffic, or some other suitable traffic characteristic, over a periodic observation interval ("POI") or some other suitable time period.

Each EN can keep a sliding window of the last n POIs from which statistics, such as average arrival rate ("FR_Rate") and standard deviation, or other suitable statistics, can be generated.

FR Request

Based on the learned traffic patterns and based on predicted subsequent ingress data or based on other data transmission characteristics (such as preferably predetermined data transmission characteristics provided by system-set parameters), a requesting node can, according to the invention, predict its future transmission requests—i.e., for data that has not been received yet at the node—and can reserve in advance TX opportunities in view of the expected traffic. This preferably reduces the media access latency of the RRAU-RR-TxOP sequence.

For example, in such systems and methods, outstanding packets could be transmitted in the next TxOP preferably immediately following their reception by the ingress node.

It should be noted that there may be a trade-off, with respect to systems and methods according to the invention, between latency and aggregation level. Accordingly, a transmitted frame could be either transmitted in each MAP cycle, without waiting for the RRAU-RR-TxOP cycle to occur, or aggregated and sent every n MAP cycles.

Preference is preferably given to latency—i.e., transmitting a frame each MAP cycle—unless the aggregated forward reservation requests for all the nodes are higher than the available data bandwidth. In this case, the NC may concatenate multiple requests in a single burst.

The FR may carry the following parameters:

TxOP duration for odd and even occurrence;

The FR occurrence (number of times this FR should be applied);

The start network time from which this FR should be applied; and

Reservation Request Interval—the time elapsed between the beginning of each TxOP to the beginning of the next TxOP;

Furthermore, if a new learned pattern (or system-set parameter) triggers new FR parameters, a new FR may be required. The new FR can preferably overwrite the current FR parameters.

Based on the learned traffic patterns (or the system-set parameter), a requesting EN could also preferably predict the average bandwidth and arrival rate steadiness for its expected ingress traffic or for some other suitable traffic characteristic.

These two parameters, the average bandwidth and arrival rate steadiness, may be used to specify a Reservation Request Rate (an "RR Rate") that the EN could indicate to the NC. Instead of scheduling an RRAU every node—e.g., in every MAP cycle or round robin periodicity—the NC could schedule the RRAU at the rate indicated by the EN.

Certain embodiments of the invention may include methods for managing transmission of data over a MoCA network. Such methods may include monitoring data transmission requirements at a node on the network; generating statistics of the data transmission requirements; predicting transmission requirements from the statistics; and reserving future transmission opportunities in view of the predicted transmission requirements.

Such methods may further include using statistics that represent an average rate of certain, preferably predetermined, data transmission requirements. Such statistics may include the standard deviation of ingress data into the node and/or the standard deviation of other representative data transmission requirements. Such statistics may also include the average latency of ingress data into and/or out of the node. Such statistics may also include average latency of the data transmission requirements.

In certain methods according to the invention, reservations may be made in a Forward Reservation Request packet. Such methods may include transmitting a reservation in a Forward Reservation Request packet. Such methods may also include receiving permission to send future—i.e., not yet received— data. Additionally, such methods may include aggregating data packets when using the future transmission opportunity.

In addition, such methods may include receiving a permission to transmit data at a future time; concatenating multiple data packets into a single packet; and transmitting the concatenated packet at the future time.

In certain methods according to the invention, the future reservation opportunity may be for transmission in the next Media Access Plan ("MAP") cycle or over a plurality of Media Access Plan ("MAP") cycles. In addition, the statistics may be gathered over one or a plurality of Media Access Plan ("MAP") cycles.

Some methods for managing transmission of data over a MoCA network via a network controller according to the invention may include receiving a request to transmit data at future time; allocating a future time for transmission of data; and sending a permission to transmit data at the future time. Such methods may further include allocating a future time only if the aggregate rate of all of the nodes in the network does not exceed an allowed rate.

A network according to the invention may be configurable to monitor data transmission requirements; generate statistics of the data transmission requirements; predict transmission requirements from the statistics; and reserves future transmission opportunities in view of the predicted transmission requirements.

Figure 1:
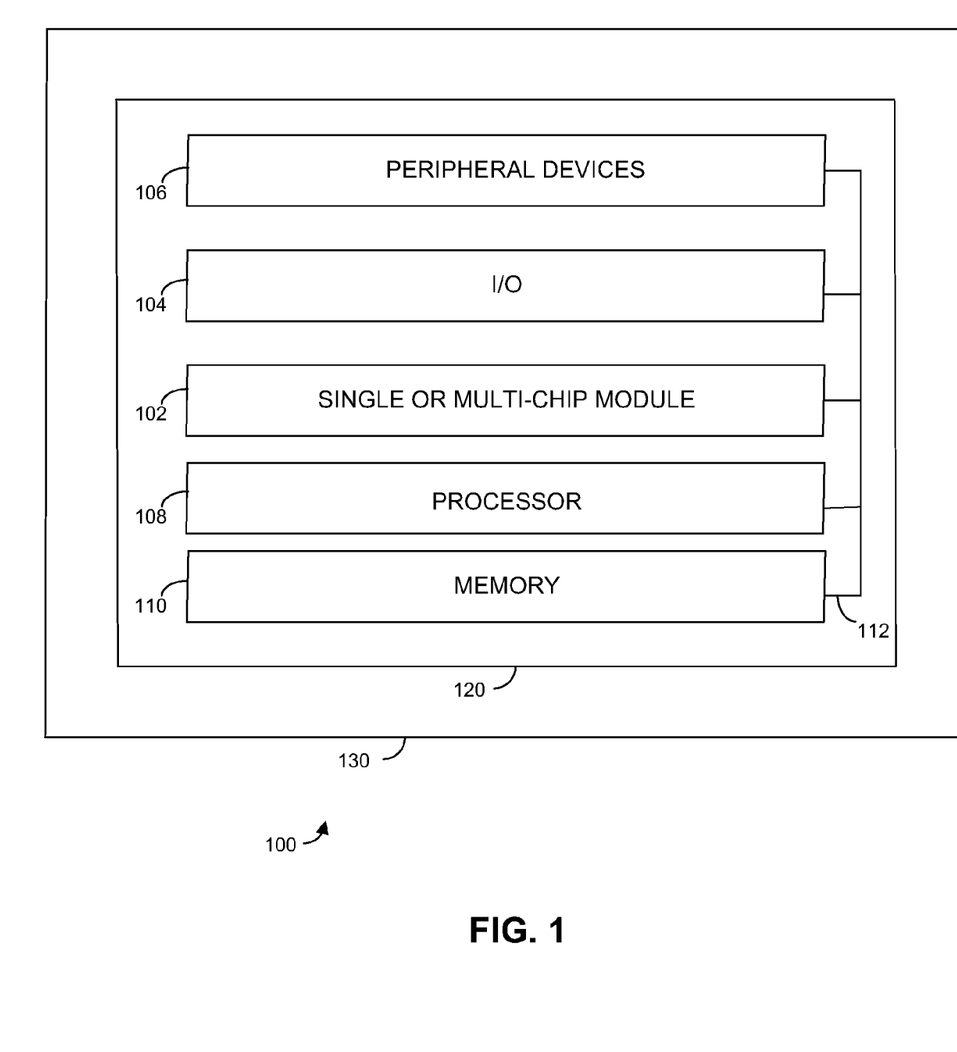
FIG. 1 is schematic diagram of an illustrative single or multi-chip module of this invention in a data processing system.

FIG. 1 shows a single or multi-chip module 102 according to the invention, which can be one or more integrated circuits, in an illustrative data processing system 100 according to the invention. Data processing system 100 may include one or more of the following components: I/O circuitry 104, peripheral devices 106, a processor 108 and memory 110. These components are coupled together by a system bus or other interconnections 112 and are populated on a circuit board 120 which is contained in an end-user system 130. System 100 may be configured for use in a cable television tuner according to the invention. It should be noted that system 100 is only exemplary, and that the true scope and spirit of the invention should be indicated by the following claims.

Figure 2:
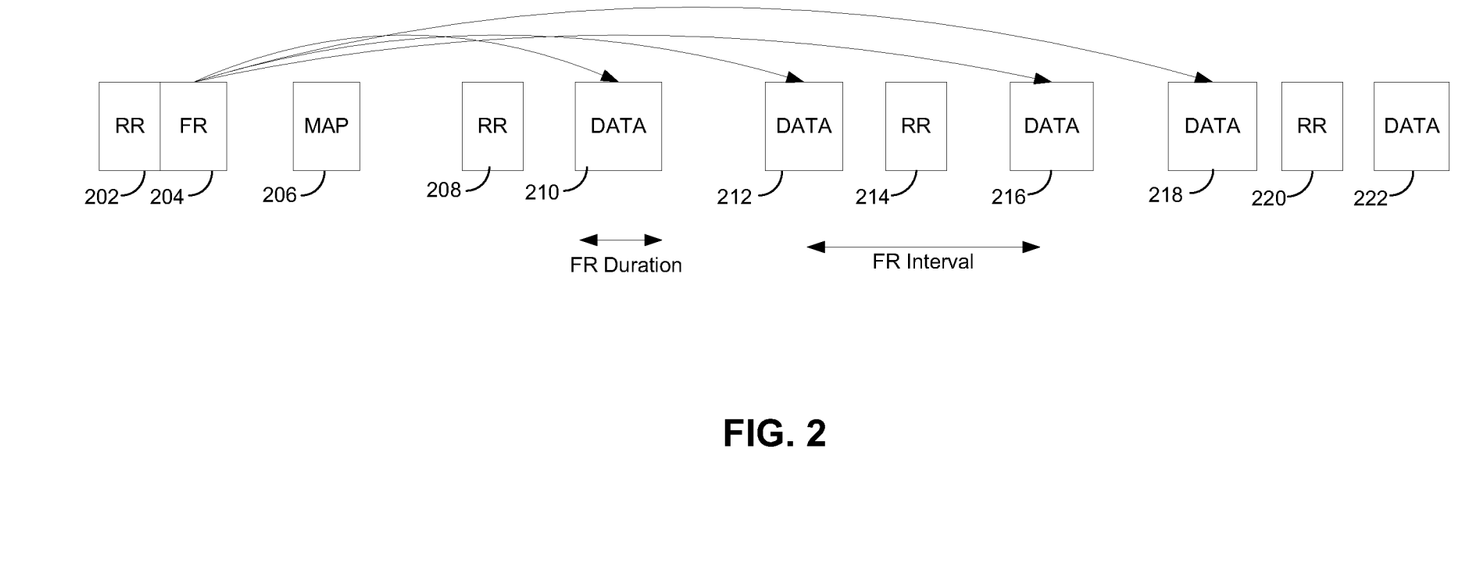
FIG. 2 shows a schematic diagram of a process according to the invention.

FIG. 2 shows a schematic diagram of a process according to the invention. The process shows an FR 204 (which may or may not follow a preceding RR 202) requesting future payload transmission opportunities for one or more MAP cycles.

A MAP cycle 206 may include numerous reservation requests (208, 214, and 220) and data transmission opportunities (210, 212, 216, 218, and 222). In the exemplary MAP cycle shown in FIG. 2, an FR duration may be considered the length of time of the requested data transmission. An FR interval may be considered the average rate of opportunities that are requested by the FR. An FR begin time may indicate when allocations according to the FR may begin and an FR end time may indicate the number of times this FR should be applied.

When data frames were not requested or granted opportunities either by the FR or in response to the FR, these data frames should be requested by "conventional" RR. Packets should be preferably transmitted in the same order that they arrive. A node should preferably pad residual duration if there is insufficient data to fill a predetermined duration.

Preferably, the nodes can predict their respective reservation requirements based on information derived from ingress data statistics or other relevant traffic statistics. Such information can be mined from the data flow that passes through the node.

The network controller operation may grant FR data transmission opportunities according to the forward reservation requests using a MAP/DAU ("Data Allocation Unit") message. Preferably, the network controller should schedule FR_Intervals as close as possible. However, the network controller may skip or delay some requested allocation units when the aggregated network throughput exceeds a predetermined threshold.

The following is an exemplary algorithm for predicting the FR interval and the FR duration. The algorithm preferably derives the FR interval and the FR duration using statistical analysis of ingress data flow measurements. In other embodiments of the invention, any suitable data transmission measurements at the node may be statistically analyzed to obtain FR interval and FR duration information.

First, an average number of bits in a 10 millisecond sliding window can be determined. The standard deviation of the average number of bits can also be determined. The average number of packets (which can be either a relatively large or small number of bits) in a 10 millisecond (or other suitable duration) sliding window can also be determined. An FR is implemented if the average number of bits and/or the average number of packets exceeds a predetermined threshold.

Based on the statistical analysis of the data transmission flow measurements, the FR duration and FR interval can be calculated. Thus, the algorithm may set an FR_Interval and an FR_Duration according to the average bit rate of the ingress flow and the standard deviation from the average bit rate of the ingress flow or from statistically-derived information based on any other suitable data transmission characteristics.

Table 1 below sets forth a Forward Reservation Request Element according to the invention:

TABLE 1

| Field | Length | Usage |
| --- | --- | --- |
| FRAME_SUBTYPE | 4 bits | If FRAME_TYPE = Ethernet Transmission<br>0x1 = FR_ETHERNET_PACKET |
| FRAME_TYPE | 4 bits | 0x3 = Ethernet Transmission |
| Destination | 8 bits | Node ID of the destination node |
| PHY_Profile | 8 bits | Indicates the type of modulation scheme used for this transmission<br>bits 7:6<br>00 = profile sequence 0<br>01 = profile sequence 1<br>bits 5:0<br>0x2 = Diversity Mode profile<br>0x7 = Unicast profile<br>0x8 = Broadcast profile<br>All other values reserved. |
| Request_ID | 8 bits | A sequence number associated with the request. |
| RESERVE from | 32 bits | Network time value to start allocation of DAUs per this request |
| RESERVE TO | 32 bits | Network time value to end allocation of DAUs per this request |
| INTERVAL | 24 bits | the interval between two FR grants (in SLOT_TIME units) |
| DURATION | 6 bits | Transmission time required in multiples of SLOT_TIME |
| PRIORITY | 4 bits | 0x0—Low Priority<br>0x1—Medium Priority<br>0x2—High Priority |
| RESERVED | 20 bits | Type III |

Transmission Control Protocol ("TCP") throughput is highly dependent on the average roundtrip delay latency and application line delay. Table 2 below sets forth the Total Round Trip Delay associated with an exemplary MoCA network. The network includes the following parameters: user data is 1460 bytes, Ethernet overhead is 58 bytes, Ethernet size is 1580 bytes, and TCP Win is 65536 bytes. The MoCA PHY rate for this exemplary network is 600 Mbps.

TABLE 2

Total Round Trip Delay (in TCP Throughput in Mbps)

| | Round Trip delay (in Milliseconds) | | | | | | | | | |
|---|---|---|---|---|---|---|---|---|---|---|
| | 1 | 1.5 | 2 | 2.5 | 3 | 3.5 | 4 | 4.5 | 5 | 5.5 | 6 |
| 100 Mbps Application Line Rate | 377 | 277 | 219 | 181 | 155 | 135 | 119 | 107 | 97 | 82 | 71 |
| 1 Gbps Application Line Rate | 492 | 335 | 254 | 204 | 171 | 147 | 129 | 115 | 103 | 86 | 74 |

When the Application Line Rate (the Application Line Rate is between the PC and the node; the PHY rate is between two nodes) is at 100 Mbps and the total round trip delay is 4.5 ms, the TCP throughput is 107 Mbps. When the Application Line Rate is 1 Gbps, and the total round trip delay is 5 ms, the TCP throughput is 103 Mbps.

With respect to TCP handling in the emerging MoCA 2.0 standard, a maximum roundtrip delay is provided. In order to obtain 100 Mbps, the required maximum roundtrip delay is about 5 milliseconds (including application delay) for a window size of 64 KB. This latency threshold cannot be met by MoCA 1.1's request-grant mechanism. The average one-way delay with MoCA 1.1's parameters is 2.8 milliseconds. The maximum available TCP throughput cannot exceed 80 Mbps. Latency should be below a 2.5 milliseconds roundtrip, including application latency 1-2 milliseconds. Systems and methods according to the invention preferably use FR to reduce latency on flows where average data rate or average packet rate is above a predetermined threshold.

The following conditions apply to a real-time simulation using FR. The simulation preferably determined FR durations and FR intervals by statistics measurement. The simulation used an averaged number of bits in a 10 millisecond sliding window, and the standard deviation of the bits. The simulation also used an averaged number of packets in a 10 millisecond sliding window, and the standard deviation of the bits. FR was applied when one or both of the average number of bits and the average number of packets exceeded a predetermined threshold.

Based on the foregoing statistics, the simulation calculated FR duration and FR intervals. The FR duration and FR interval were set according to the standard deviation of packet rate and the standard deviation of the bit rate. In one exemplary simulation, the average MAP cycle size=1000 Micro seconds, the FR was set for the next 3 MAP cycles and the PHY rate was set at 600 Mbps. The RR was assumed as given for each 3 MAP cycles.

Figure 3:
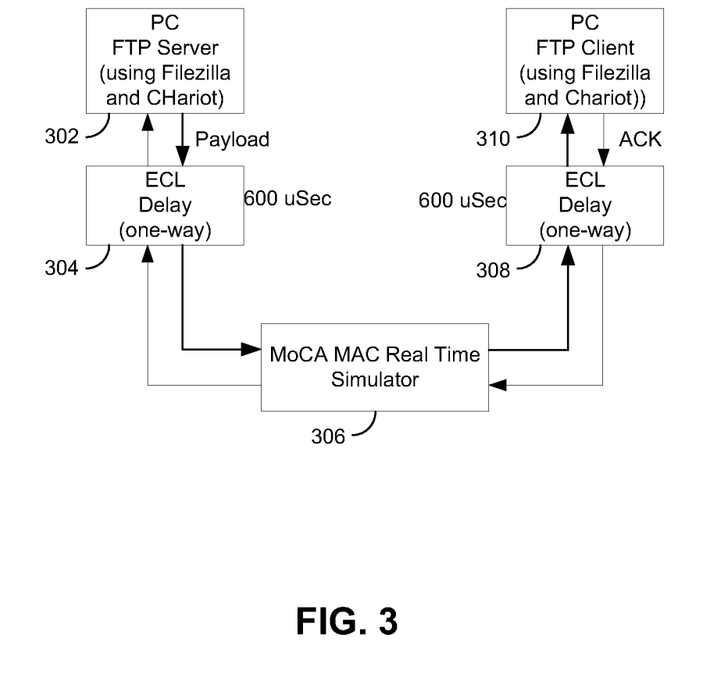
FIG. 3 shows an illustrative flow diagram that sets forth the various conditions of the exemplary process that was implemented by the simulation according to the invention.

FIG. 3 shows an illustrative flow diagram that sets forth the various conditions of the exemplary process that was implemented by the simulation. The PC FTP server 302 which may use a suitable open source application such as Filezilla, or Chariot manufactured by IXIA Software of Calabasas, Calif., for TCP Payload and/or Acknowledgment payload ("ACK"). PC FTP server 302 may send a payload via the Ethernet Convergence Layer 304 ("ECL"). The ECL may introduce a 600 uSec delay both in the payload direction and the ACK direction.

A MoCA MAC Real Time simulator 306 was used to simulate the network. Another ECL 308 and server 310 was used on the second side of the simulation to simulate the delay involved with receiving and a second transmission. As stated above, the test conditions were as follows:

Average MAP cycle size=1000 uSec
FR for 3 future MAP Cycles
(assume RR given each 3 MAP cycle)
PHY Rate=600 Mbps

| Stream Type | Packet size [B] | AVG bit rate [mb] | AVG Packet Rate p1ms | STD | FR Interval [us] | FR Size [B] | Actual Through-put [mb] | Actual time on wire w/o RRs [us] | Average MoCA Latency [us] |
|---|---|---|---|---|---|---|---|---|---|
| TCP Payload (Filezilla) | 1318 | 146.6 | 13.9 | 10 | 595 | 10412.2 | 105 | 247 | 1791 |
| TCP ACK (Filezilla) | 64 | 2.0 | 3.9 | 1 | 610 | 505.6 | | 45 | 690 |
| UDP | 1518 | 100.2 | 8.25 | 1 | 1000 | 11992.2 | 100 | 227 | 800 |
| UDP | 1518 | 399.5 | 32.9 | 1 | 976 | 11992.2 | 400 | 800 | 976 |
| UDP | 64 | 16.8 | 32.8 | 1 | 976 | 505.6 | 16.8 | 148.7 | 976 |
| TCP Payload (Chariot) | 1318 | 186.6 | 17.7 | 6 | 675 | 10412.2 | 145 | 304 | 1741 |
| ACK Payload (Chariot) | 64 | 2.4 | 4.7 | 1 | 604 | 505.6 | | 45.8 | 796 |

Figure 4:
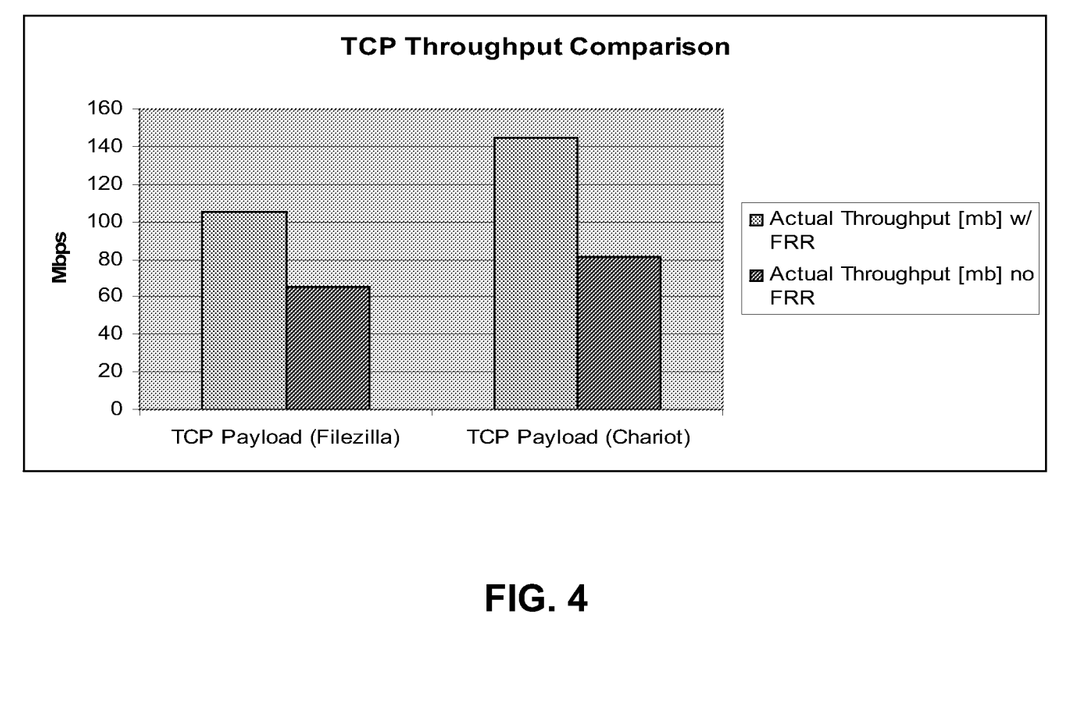
FIG. 4 shows a comparison between the TCP throughput using Forward Reservation to the TCP throughput using no Forward Reservation.

FIG. 4 shows a comparison between the TCP throughput using FR to the TCP throughput using no FR.

Figure 5:
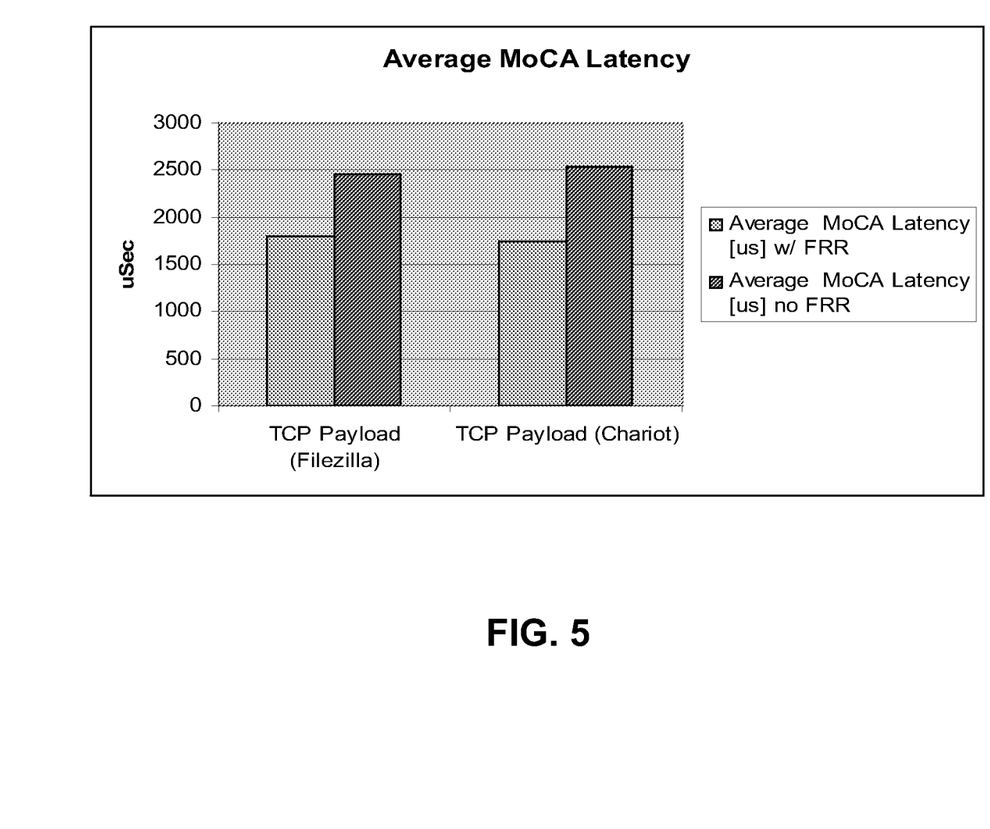
FIG. 5 shows a comparison of the MoCA Latency using Forward Reservation to the MoCA latency using no Forward Reservation.

FIG. 5 shows a comparison of the MoCA Latency using FR to the MoCA latency using no FR.

Figure 6:
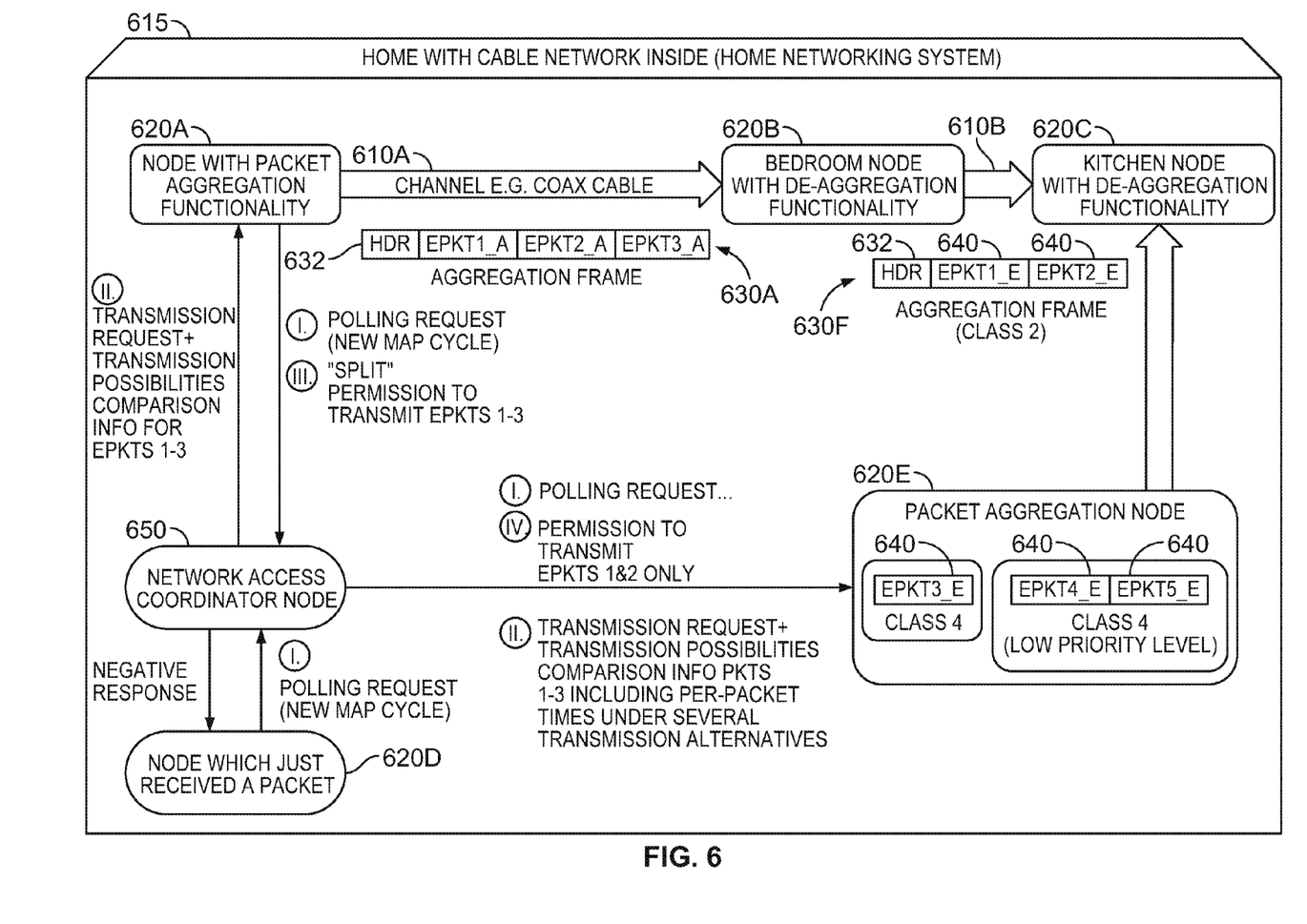
FIG. 6 is a schematic diagram of an exemplary MoCA network for use with systems and methods according to the invention.

FIG. 6 is a schematic diagram of an exemplary MoCA network for use with systems and methods according to the invention.

FIG. 6 is a simplified block diagram illustration of a home networking over coax system being constructed and operative in accordance with a preferred embodiment of the present invention. The system of FIG. 6 is operative for transmitting packets over a network of communication channels within a home 615 (such as, for example, the channels indicated in FIG. 6 by reference numerals 610A and 610B, referred to collectively hereinafter as "channels 610"). The channels may be wired channels e.g. cables such as coax cables. Also installed in the home 615 at endpoints of the channels 610 is a set of nodes 620 of which five nodes 620A—620E are shown by way of example. At least some of the nodes (620A and 620E in the illustrated embodiment, nodes 620A-620E referred to collectively hereinafter as "nodes 620") have a packet aggregation functionality in which the node forms an aggregation frame 630A, 630F by aggregating a plurality of packets 640 which have accumulated at the node. If at least one packet 640 has accumulated at the node, each node is operative, eventually, to transmit a frame including that packet and perhaps others, typically upon grant of solicited (as in the illustrated embodiment) or unsolicited permission to transmit.

Generally, as described in detail below, the system of FIG. 6 is useful in performing the following method for transmitting packets over a network of communication channels interconnecting a set of nodes. The method may include using a network access coordinator to coordinate access of the set of nodes to the network of channels by granting permission to transmit to individual nodes. The method may further include forming an aggregation frame at one (or more) node(s) by aggregating a plurality of packets which have accumulated at the node. The method may include as well informing the network access coordinator accordingly, and providing the network access coordinator with comparison information comparing different transmission possibilities for the aggregation frame. If at least one packet has accumulated at a node, the method may include transmitting at least one frame upon grant of permission to transmit to that node by the network access coordinator. Each frame may comprise at least one packet. The coordinator is typically operative to determine which portion, if any, of the aggregated packets can be transmitted.

Typically, each node comprises a modem having a CL (Convergence) layer, a Media Access Control layer and a PHY layer and the packet aggregation functionality is performed at the CL layer (at the ECL layer, if the packets are Ethernet packets, abbreviated "Epkts" in FIG. 6).

Each aggregation frame 630A, 630F typically comprises at least some of the following information: an indication that the frame is an aggregation frame rather than a single-packet frame and an indication of the size of at least some of the packets in the frame. This information is typically stored in the header 632 of the aggregation frame. Each packet 640 in each frame typically has a header having CRC (cyclic redundancy check) code for the header itself and CRC code for the content of the packet.

A network access coordinator 650, which may be a node itself, is operative to coordinate the access of the plurality of nodes 620 to the network of channels 610 by granting or refusing transmission requests or by granting unsolicited transmission permission. At least one of the nodes 620 is operative to inform the network access coordinator 650 when it has formed an aggregation frame 630 comprising at least one aggregated packet 640. The network access coordinator 650 is operative responsively to determine which portion, if any, of the aggregated packets 640 can be transmitted.

Typically, as shown, at least one node 620 is operative to send a transmission request and the network access coordinator 650, responsively, selectively grants or refrains from granting permission to transmit. In FIG. 6, for example, node 620A requests permission to transmit three Ethernet packets (aggregated in frame 630A) to node 620B which is located in the bedroom. Permission is granted, albeit in two separate time slots (see steps I, II, and III (slot III which indicates that a split permission is granted)) whose combined length suffices to transmit the three packets Epkt¬1_A, Epkt2_A and Epkt3_A.

Node 620E also requests permission to transmit three Ethernet packets to node 620C which is located in the kitchen (as shown in slot IV). However, coordinator 650 grants permission to transmit only two of these (as shown in slot V). Therefore, packet Epkt3 remains at node 620E for the time being. Nodes 620B and 620C each de-aggregate the frames 630A and 630E that they respectively receive as shown.

Packets 640 may comprise packets of different classes and at least one Tx node 620 may be operative to aggregate packets accumulating at the node, as a function of the class to which the packets belong. For example, in FIG. 6, node 630A accumulated two Class 2 packets, two Class 4 packets aggregated together, and another Class 4 packet not aggregated with the other two. Class 4 is a class of low priority level packets in the illustrated example. The packets in Class 2 may, for example, be characterized by having a common QoS, and/or a common priority level, and/or common membership in a particular flow; and/or any other packet attribute or set of packet attributes. Aggregation "rules" observed by individual nodes may be dependent on class. For example, individual nodes 640 may be operative to aggregate only packets belonging to classes included in predefined classes and to refrain from aggregating packets belonging to classes other than those predefined classes.

Individual nodes 640 may be operative to aggregate all packets which have accumulated at the node between each of the node's transmission requests. This optional aggregation "rule" may refer to any transmission request or may be specific to transmission requests pertaining to a particular class of node.

In the system of FIG. 6, at least one node may be operative to send a transmission request periodically.

The system of FIG. 6 may, for example, operate within or in conjunction with a Home Network modem in general and in particular a home network over coaxial cables such as, by way of example, the home network over coaxial wires as described in the above-referenced MoCA specification. In the MoCA specification, a coordinated home network is described in which an NC exists and coordinates the access to the medium. Only one node is allowed to transmit at a time, creating a non-collision network. This facilitates the ability to carry video as well as voice and data signals over the same network, while retaining the requirements of video and voice streaming and Quality of Service.

Thus, systems and methods for reducing reservation request overhead in a communications network have been described.

Aspects of the invention have been described in terms of illustrative embodiments thereof. A person having ordinary skill in the art will appreciate that numerous additional embodiments, modifications, and variations may exist that remain within the scope and spirit of the appended claim. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

What is claimed is:

1. A method for managing transmission of data over a coaxial network, the method comprising:
   determining whether an amount of information received at a node on the coaxial network, the amount of information being received in a predetermined period of time preceding the determining, is greater than a predetermined threshold amount of information; and
   if the amount of information received at the node in the preceding predetermined period of time is greater than the predetermined threshold amount of information, then
   requesting a future transmission opportunity—for transmitting data from the node in the future.

2. The method of claim 1, wherein the amount of information is received at the node from an upper layer of the node.

3. The method of claim 1, wherein the predetermined period of time is at least 10 milliseconds.

4. The method of claim 1, further comprising requesting the future transmission opportunity for transmitting data that has not yet arrived at the node.

5. The method of claim 1, further comprising monitoring data transmission at the node and generating statistics of the data transmission, said generating being based at least in part on the monitoring, wherein the statistics comprise average rate of ingress data into the node and wherein the requesting is based, at least in part, on the statistics.

6. The method of claim 5 wherein the statistics comprise average rate of the data transmission.

7. The method of claim 5 wherein the statistics comprise standard deviation of ingress data into the node.

8. The method of claim 5 wherein the statistics comprise standard deviation of data transmission at the node.

9. The method of claim 5 wherein the statistics comprise average latency of ingress data into the node.

10. The method of claim 5 wherein the statistics comprise average latency of the data transmission.

11. The method of claim 5 wherein the statistics comprise statistics gathered over a plurality of Media Access Plan ("MAP") cycles.

12. The method of claim 1 wherein the requesting is made in a forward reservation request packet.

13. The method of claim 1 further comprising receiving permission to send future data.

14. The method of claim 1, further comprising:
   requesting additional future transmission opportunities while the amount of information received at the node in the preceding predetermined period of time is greater than the predetermined threshold amount of information.

15. The method of claim 1 further comprising aggregating data packets when using the future transmission opportunity.

16. The method of claim 1 further comprising:
   receiving a permission to transmit data at a future time;
   concatenating multiple data packets into a single packet; and
   transmitting the single packet at the future time.

17. The method of claim 1 wherein the future transmission opportunity comprises an opportunity in a future Media Access Plan ("MAP") cycle.

18. A method for managing transmission of data over a coaxial network, the coaxial network formed from a plurality of network nodes and a coaxial backbone, the managing using a network controller, the method comprising:
   receiving, at the network controller, a request from one of the plurality of network nodes, the request for transmitting data at a future time, the request being based on a prediction of a future transmission requirement for the node, the data not yet received by the node, the prediction of the future transmission requirement being based on prior activity of the node;
   allocating a future time for transmission of data when an aggregate rate of the nodes in the network does not exceed an threshold rate; and
   sending a permission to the node to transmit data at the future time.

19. The method of claim 18, wherein the aggregate rate of the nodes in the network comprises an aggregate of bandwidth allocated to the nodes in a next media access plan cycle for packets having a common quality of service.

20. The method of claim 18, wherein:
   the prediction of a future transmission requirement for the node is derived from determining whether an amount of information received at a node on the network, the amount of information being received in a predetermined period of time prior to the determining, is greater than a predetermined threshold amount of information; and
   if the amount of information received at the node in the preceding predetermined period of time is greater than the predetermined threshold amount of information; then proceeding to allocate the future time for transmission of data.

21. The method of claim 20, wherein the determining is based, at least in part, on monitoring data transmission at the node and generating a plurality of statistics of the data transmission, said generating being based at least in part on the monitoring, wherein the statistics comprise average rate of ingress data into the node.

22. The method of claim 20, wherein the predetermined period of time is at least 10 milliseconds.

23. A node for use in a coaxial network, the node configured to:
   determine whether an amount of information received at the node, the amount of information being received in a preceding predetermined period of time, is greater than a predetermined threshold amount of information; and
   if the amount of information received at the node in the preceding predetermined period of time is greater than the predetermined threshold amount of information, request a future transmission opportunity for transmitting data from the node, said opportunity for transmitting opportunity occurring in the future.

24. The node of claim 23, wherein the amount of information is received from an upper layer of the node.

25. The node of claim 23, wherein the future transmission opportunity for transmitting data is for transmitting data that has not yet arrived at the node at the time at which the node is configured to request the future transmission opportunity.

26. The node of claim 23 is further configured to:
   monitor data transmission at the node; and
   generate a plurality of statistics of the data transmission, said statistics being based at least in part on the monitoring, wherein the statistics comprise average rate of ingress data into the node and wherein the requesting is based, at least in part, on the plurality of statistics.

27. The node of claim 23, wherein the predetermined period of time is greater than or equal to 10 milliseconds.

* * * * *

UNITED STATES PATENT AND TRADEMARK OFFICE
CERTIFICATE OF CORRECTION

PATENT NO. : 8,737,254 B2  
APPLICATION NO. : 13/535755  
DATED : May 27, 2014  
INVENTOR(S) : Avraham Kliger et al.

Page 1 of 1

It is certified that error appears in the above-identified patent and that said Letters Patent is hereby corrected as shown below:

IN THE CLAIMS:

In Column 12, Line 49 and 50

Replace "transmitting opportunity occurring in the future", with --transmitting occurring in the future--.

Signed and Sealed this  
Third Day of March, 2015

Michelle K. Lee  
*Deputy Director of the United States Patent and Trademark Office*